No. 766,365. Patented August 2, 1904.

UNITED STATES PATENT OFFICE.

JAMES P. LOUGH, OF NEW YORK, N. Y.

APPARATUS FOR WASHING STORAGE BATTERIES.

SPECIFICATION forming part of Letters Patent No. 766,365, dated August 2, 1904.

Application filed May 17, 1904. Serial No. 208,328. (No model.)

*To all whom it may concern:*

Be it known that I, JAMES P. LOUGH, of New York, in the county of Richmond and State of New York, have invented a new and Improved Apparatus for Washing Storage Batteries, of which the following is a full, clear, and exact description.

My invention relates to improvements in apparatus for washing, cleansing, and removing the accumulated sediment from storage batteries. Storage batteries as usually constructed have a space at the bottom below the plates, and in the course of time the accumulated peroxid of lead or other matter fills up this space, and when the sediment comes in contact with the plates the battery is short-circuited and its efficiency impaired.

The object of my invention is to produce a simple portable device which can be quickly applied to storage batteries and which has a pressure circulatory system constructed and arranged so that the sediment in the battery will be quickly sucked through one pipe and it will be stirred up by reason of the pressure from a second pipe, so that in a very short time the sediment is removed.

My invention also comprises means for precipitating the sediment to the end that it may be saved and the electrolyte returned to the battery; and my invention further provides a convenient and simple means of drawing off the watery matter from the precipitating-tank and permitting the sediment, chiefly lead peroxid, to be saved.

With these ends in view my invention consists of certain features of construction and combinations of parts, which will be hereinafter described and claimed.

Reference is to be had to the accompanying drawing, forming a part of this specification, in which similar figures of reference indicate corresponding parts in the view.

The figure is a diagrammatic sectional elevation of the complete apparatus.

In the drawing the storage battery 10 can be of any usual type, and I have shown it having the customary plates 11 and with the usual space 12 below the plates. Obviously the style of battery has nothing to do with my invention. It will be noticed that when the sediment rises in the space 12 so as to touch the plates 11 the latter will be short-circuited. My invention provides for removing this, as described, and also for washing the plates. To this end I provide two flexible pipes or hose 13 and $13^a$, adapted to be inserted in opposite ends of the battery, as shown, and the free ends of the pipes should extend to the bottom of the battery. The pipe 13 delivers into a precipitating-tank 14, which can be of any preferred form and which may conveniently be a simple cylinder, the connection between the pipe 13 and the tank being preferably near the top of the latter. Diagonally in the tank I arrange a baffle 15, so that the liquid in circulating has to pass below the baffle, then rise, thus hastening the precipitation. Leading from the upper part of the tank 14, and preferably on the side opposite to the inlet-pipe 13, is a pipe 16, which is also, preferably, a hose, and this connects with the intake of a pump 17, which latter is preferably a rotary pump. The outlet of the pump communicates with the pipe $13^a$.

The tank 14 has a valve-controlled drain-pipe 18, through which the sediment may be withdrawn, and it has also a siphon-pipe 19, which may or may not act as a siphon, according as the liquid in the tank is above or below the cock 20, through which the siphon-pipe delivers. The pipe 19 is a flexible pipe, and its free end connects with a float 21, the pipe having a suitable opening through the float, as shown at 22.

When the apparatus is to be used, the circulating apparatus is first primed—that is, filled with water or electrolyte—and the pump is then started. It will be seen that the suction from the pump will draw off the sediment and electrolyte in the battery 10 and that the same will be discharged into the tank 14. The passage of material through the tank is relatively slow, because of its large area, though the pressure is the same as in the pipes 13 and $13^a$. By reason of its slow movement and the weight of the sediment the latter settles readily in the tank 14, and the lighter part, or the electrolyte or water, passes off through the pipe 16, pump 17, and pipe 13ª. As the circulating liquid is discharged from the pipe 13ª it has sufficient force to stir up the contents of the battery, raising the sediment with the contained electrolyte, and the cleaning process is therefore hastened, and as the battery becomes quite clear of sediment the plates 11 are washed clean by reason of the agitation in the battery.

Attention is particularly called to the drawing-off pipe 19. It will be seen that the float 21 causes the inlet end of the pipe to be near the upper part of the liquid, and consequently but little of the sediment is drawn off, and, further, it will be noticed that if the level of the liquid is below that part of the pipe which passes through the tank the pipe will have a siphon action and still draw off the liquid.

I am well aware that circulatory systems have been used in connection with boiler-filters and similar things, and I wish to emphasize the fact that my apparatus is a portable affair, has no permanent connection with the battery to be cleaned, that, on the contrary, it can be easily removed from one battery and connected with another, and that I provide a very complete system for separating the lighter and heavier parts of the battery contents.

The washing of the plates can be facilitated by removing the nozzle from the end of the pipe 13ª and inserting the blunt end of the hose in the spaces between the plates 11. This will effectually clean the adjacent surfaces of the plates and loosen the material that is accumulated on them.

Having thus fully described my invention, I claim as new and desire to secure by Letters Patent—

1. An apparatus for washing storage batteries, comprising a precipitating-tank having suitable drainage means, a pump connected with the upper portion of the tank, and flexible pipes connected respectively to the tank and the pump, the said pipes having their other ends free.

2. An apparatus for washing storage batteries, comprising a precipitating-tank having suitable drainage means, flexible pipes having a connection with the tank and having also free ends to permit their insertion in a battery, and means for promoting circulation through the tank, the pipes and the vessel in which the free ends of the pipes are placed.

3. An apparatus for washing storage batteries, comprising a precipitating-tank having a baffle extending downward from the upper part thereof, a flexible pipe having one free end and its other end connected with the tank on one side of the baffle, a pump connected with the tank on the opposite side of the baffle, and a second pipe having a free end, the said second pipe being also connected with the pump.

JAMES P. LOUGH.

Witnesses:
Wm. H. Camfield,
John T. Carolan.